United States Patent [19]

Dobša et al.

[11] Patent Number: 4,567,423

[45] Date of Patent: Jan. 28, 1986

[54] PHASE SHIFTING TRANSFORMER ARRANGEMENT FOR DAMPING SUBSYNCHRONOUS OSCILLATIONS

[75] Inventors: Josip Dobša, Oberrohrdorf; Adel Hammad, Wettingen, both of Switzerland

[73] Assignee: BBC Brown, Boveri & Company, Limited, Baden, Switzerland

[21] Appl. No.: 598,503

[22] Filed: Apr. 9, 1984

[30] Foreign Application Priority Data

Apr. 8, 1983 [CH] Switzerland .................. 1907/83

[51] Int. Cl.$^4$ .............................................. H02P 9/00
[52] U.S. Cl. ...................................... 322/58; 307/102; 323/215
[58] Field of Search ............................ 322/32, 58, 90; 323/212, 215; 307/102; 361/111

[56] References Cited

U.S. PATENT DOCUMENTS 4,384,246 5/1983 Larsen et al. ..................... 322/58

FOREIGN PATENT DOCUMENTS 2809860 11/1978 Fed. Rep. of Germany ........ 322/90

OTHER PUBLICATIONS

Mathur et al., "A Thyrister Controlled Static Phase-Shifter for AC Power Transmission", Conf. Paper, IEEE 1980 Power Engineering Spec. Summer Meeting, Minneapolis, Mn., USA, (Jul. 13–18, 1980), 6 pages.

Primary Examiner—William H. Beha, Jr.
Attorney, Agent, or Firm—Burns, Doane, Swecker & Mathis

[57] ABSTRACT

Subsynchronous oscillations in a polyphase power network can be effectively damped with a switching arrangement having a thyristor-switched regulation and a phase shifting polyphase power system. The arrangement is controllable and is periodic in nature, being responsive to a measurement signal representing a physical parameter of the subsynchronous oscillations. This signal preferably represents the difference between the instantaneous rotational frequency of the generator and a set-point value for that frequency. Control windings are connected in series with the power-network-side polyphase windings of a block transformer. Voltages induced in these control windings are phase shifted with respect to the voltages in the respective associated power-network-side polyphase windings of the block transformer. These voltages in the control windings produce a very effective damping torque on the generator, to damp out the subsynchronous oscillations.

8 Claims, 7 Drawing Figures a)

b)

PHASE SHIFTING TRANSFORMER ARRANGEMENT FOR DAMPING SUBSYNCHRONOUS OSCILLATIONS

BACKGROUND OF THE INVENTION

The invention relates to a switching arrangement for increasing stability in a polyphase power system fed by a generator.

A switching arrangement of the type to which the present invention relates is known, e.g., from the 1973 article by O'Kelly, D. and G. Musgrave, entitled "Improvement of power-system transient stability by phase-shift insertion," Proc. IEE [(Lon.)], v. 120 no. 2 (Feb.), pp. 247–252.

The known switching arrangement is suitable for increasing transient stability in a polyphase power system. "Transient stability" in this context is stability with respect to so-called "null mode excitation". The known switching arrangement is also often referred to as "slip stabilizing".

In addition to the null excitation mode, polyphase power systems, particularly those which are series compensated with capacitors and have an eigenfrequency near an eigenfrequency of the mechanical system comprising the generator and its driving turbine, also have further excitation modes known as modes 1, 2, 3, etc. These excitation modes have frequencies which are between 4 and 40 Hz below the power network frequency, and may also be referred to as "subsynchronous oscillations" or "subsynchronous resonances". In a mechanical system comprised of a generator and a turbine, subsynchronous oscillations may be, e.g., torsional oscillations of the individual rotating masses, particularly in a case where the turbine is comprised of separate high-pressure, medium-pressure, and low-pressure sections. In a number of instances in the past, such subsynchronous oscillations have led to equipment damage.

The known switching arrangement does not enable subsynchronous oscillations to be damped.

BRIEF STATEMENT OF THE INVENTION

The principal object of the invention is thus to devise a switching arrangement which is suitable for damping subsynchronous oscillations. This object is achieved according to the invention by the features set forth in claim 1.

Subsynchronous oscillations are quickly and effectively damped with the inventive switching arrangement.

The invention is technically simple and economical to realize—i.e., in its embodiments. It may be installed advantageously in existing systems as well as in prospective systems.

The power employed via the switching arrangement to damp the subsynchronous oscillations amounts to only a few percent of the total power in the polyphase system, and can be withdrawn directly from the power system itself.

The power generation system comprising the turbine and generator may remain continuously connected to the polyphase power network even after subsynchronous oscillations have been excited. There is no need to disconnect the polyphase power network from the generator.

Additional advantages of the invention, and additional advantageous refinements, adaptations, and embodiments of the invention which are characterized in the dependent claims will become apparent from the following description of exemplary embodiments with reference to the drawings.

DETAILED DESCRIPTION

Figure 1:
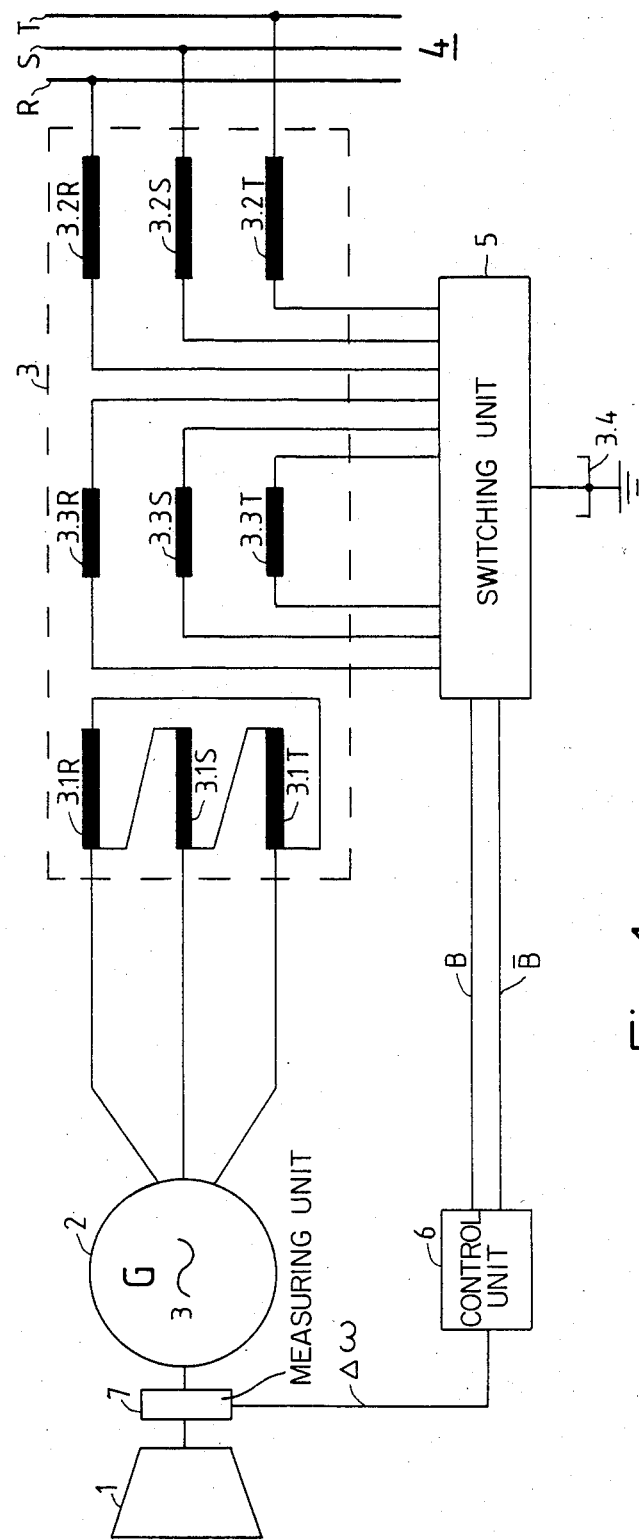
FIG. 1 is a block circuit diagram of a 3-phase power system fed by a generator, incorporating a first embodiment of the inventive switching arrangement.

In the Figures, corresponding parts have been given corresponding reference numerals.

FIG. 1 shows a turbine 1 which drives a 3-phase AC generator 2. The generator 2 feeds a 3-phase power network 4 via a block transformer 3. The phases of the 3-phase network are designated R, S, and T.

The block transformer 3 comprises 3-phase windings 3.1R, 3.1S and 3.1T which are delta connected on the generator side of the circuit, and on the power network side it comprises the 3-phase windings 3.2R, 3.2S, and 3.2T which are star connected; and it further comprises control windings 3.3R, 3.3S, and 3.3T.

As may be seen immediately from the assignment of reference numerals, the control winding 3.3R and the network-side 3-phase winding 3.2R are both associated with the generator-side 3-phase- widing 3.1R, thus the entire flux generated in the generator-side 3-phase winding 3.1R (except for unavoidable leakage losses) is passed through the control winding 3.3R and the network-side 3-phase winding 3.2R. Correspondingly, the control winding 3.3S and the network-side 3-phase winding 3.2S are both associated with the generator-side 3-phase winding 3.1S; and the same relationship exists between the windings 3.3T, 3.2T and 3.1T.

The star point 3.4 of block transformer 3 lies not in the transformer proper but in a switching unit 5, where it is grounded. The control windings 3.3R, 3.3S, and 3.3T are connected in series [(see FIG. 2)] between the star point 3.4 and the network-side 3-phase windings 3.2R, 3.2S, and 3.2T, via the switching unit 5.

Figure 2:
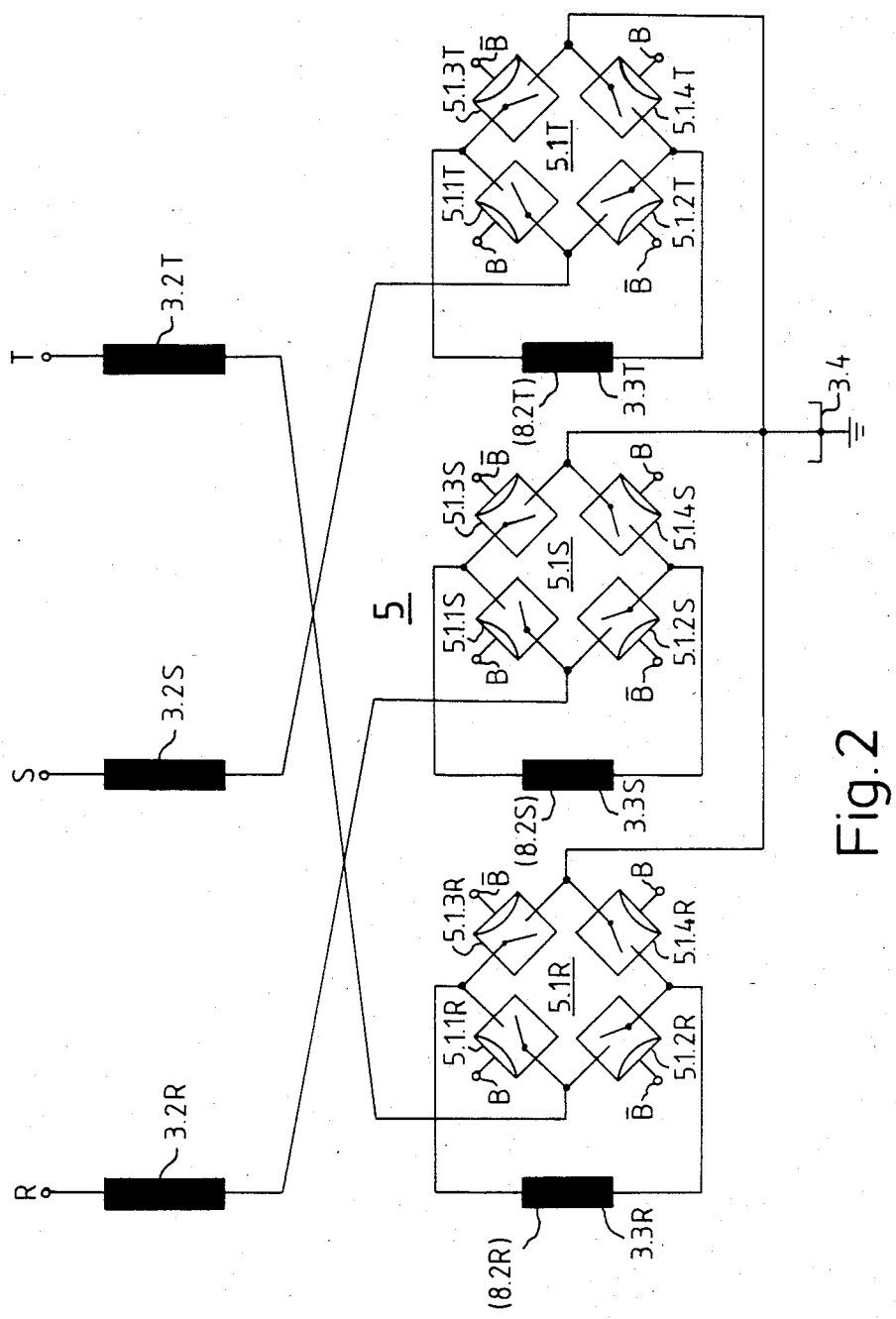
FIG. 2 is a circuit diagram of an embodiment of the inventive switching unit.

FIG. 2 shows an example of the arrangement of switching unit 5, with the connections of the 3-phase windings 3.2R, 3.2S, and 3.2T, and the control windings 3.3R, 3.3S, and 3.3T. These control windings are connected in respective diagonal branches of bridge circuits 5.1R, 5.1S, and 5.1T. In parallel with these diagonal branches are the respective arms of bridge circuits 5.1R, 5.1S, and 5.1T wherewith each segment of an arm contains a switch. Thus, the left arm of bridge circuit 5.1R (as shown in FIG. 2) contains switches 5.1.1R and 5.1.2R in its respective segments; and the corresponding right arm (as shown in FIG. 2) contains switches 5.1.3R and 5.1.4R in its respective segments; and similarly for bridge circuit 5.1S and its switches 5.1.1–4S, and for bridge circuit 5.1T and its switches 5.1.1–4T. All the aforementioned switches are controllable, and thus each has at least one control input. Preferably the devices employed as the switches are thyristor switches, each of which is comprised of a plurality of thyristors connected in parallel.

The power-network-side 3-phase winding 3.2T of block transformer 3 is connected to bridge circuit 5.1R at a connecting point (of said bridge circuit) located between switches 5.1.1R and 5.2.2R; the network-side 3-phase winding of 3.2R of block transformer 3 is connected to bridge circuit 5.1S at a connecting point located between switches 5.1.1S and 5.1.2S; and the network-side 3-phase winding 3.2S of block transformer 3 is connected to bridge circuit 5.1T at a connecting point located between switches 5.1.1T and 5.1.2T. Thus, the control windings 3.3R, 3.3S, and 3.3T are connected to the network-side 3-phase windings 3.2R, 3.2S, and 3.2T in a staggered, or offset, arrangement, via the bridge circuits 5.1R, 5.1S, and 5.1T.

The nodes between switches 5.1.3R and 5.1.4R; 5.1.3S and 5.1.4S; and 5.1.3T and 5.1.4T are all connected to the star point 3.4 of the block transformer 3.

The two alternate ways of connecting the control winding to the corresponding network-side 3-phase winding will be described with reference to bridge circuit 5.1R, control winding 3.3R, and network-side 3-phase winding 3.2T. Corresponding operations exist with control windings 3.3S and 3.3T, network-side 3-phase windings 3.2R and 3.2S, and bridge circuits 5.1S and 5.1T. The "first switching mode" (so-called hereinafter) of the control winding 3.3R to the network-side 3-phase winding 3.2T is brought about by closing switches 5.1.1R and 5.1.4R while leaving switches 5.1.2R and 5.1.3R open; and the "second switching mode" is accomplished by closing switches 5.1.2R and 5.1.3R while leaving switches 5.5.1R and 5.1.4R open. Changing from one switching mode to the other amounts to reversal of the connections of control winding 3.3R.

If switches 5.1.1R and 5.1.3R are closed while switches 5.1.2R and 5.1.4R are open, the network-side 3-phase winding 3.2T is directly connected to the star point 3.4, and the control winding 3.3R is not switched into the circuit. The same conditions exist if switches 5.1.2R and 5.1.4R are closed while switches 5.1.1R and 5.1.3R are open.

The staggered connection of control windings 3.3R, 3.3S, and 3.3T to the network-side 3-phase windings 3.2R, 3.2S, and 3.2T, and the association of windings 3.2R, 3.2S, and 3.2T with the generator-side 3-phase windings 3.1R, 3.1S, and 3.1T causes a phase shift in the voltages U3.3R, U3.3S, and U3.3T in the control windings 3.3R, 3.3S, and 3.3T with respect to the voltages U3.2R, U3.2S, and U3.2T in the network-side 3-phase windings 3.2R, 3.2S, and 3.2T, which windings are in a one-to-one association with the individual control windings 3.3S, 3.3T, and 3.3R. This phase shift is a 120° lead angle in the case of the aforementioned "first switching mode", and a 60° lag angle in the case of the aforementioned "second switching mode".

Figure 3:
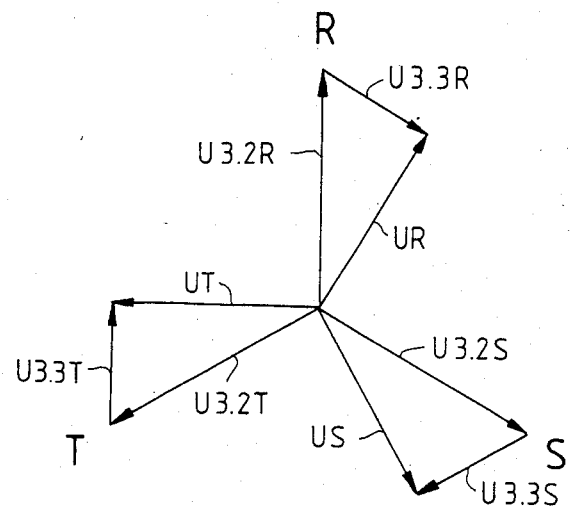
FIGS. 3a and 3b are voltage vector diagrams.
Figure 3:
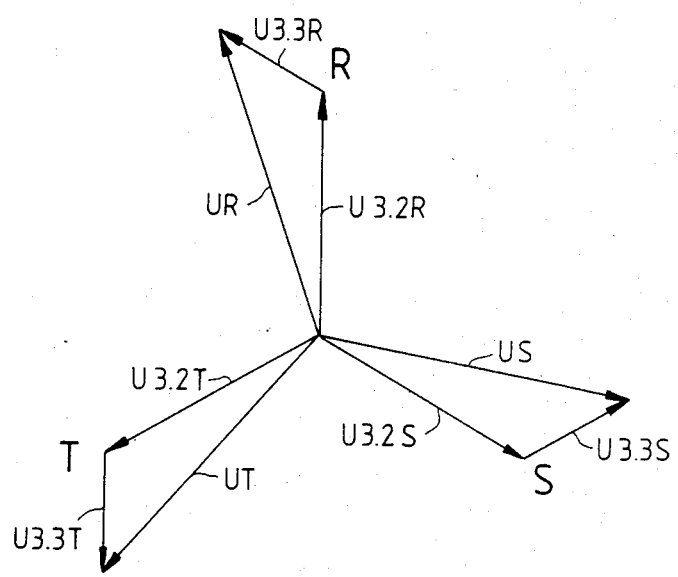

FIG. 3 shows the vector-diagram vectors for the mentioned voltages. The sequence of the phases R, S, and T (i.e., the direction of phase rotation of the 3-phase system) is taken as clockwise. FIG. 3a represents connection of the control windings in the "first switching mode", and FIG. 3b correspondingly represents the "second switching mode". The resultant phase voltages UR, US, and UT comprising the respective vector sums of the voltages U3.3R, U3.3S, and U3.3T in the control windings 3.3R, 3.3S, and 3.3T and the voltages U3.2T, U3.2R, and U3.2S in the correspondingly associated network-side 3-phase windings 3.2T, 3.2R, and 3.2S, are phase shifted in the direction of the phase rotation direction of the 3-phase system, when considered with respect to voltages 3.2R, 3.2S, and 3.2T (to which voltages (U3.2R-T) the phase voltages UR, US, and UT are respectively identical when the control windings 3.3R, 3.3S, and 3.3T are not connected, in the case of the "first switching mode", (FIG. 3a). In the case of the "second switching mode" (FIG. 3b), the phase shift is in the direction opposite to the phase rotation direction of the 3-phase system.

In addition to the phase shift, there is a change in the amplitude of the resultant phase-voltages UR, US, and UT, in both switching modes in which the control windings 3.3R, 3.3S, and 3.3T are connected into the circuit.

The phase shift of the phase voltages UR, US, UT brought about by connecting the control windings 3.2R, 3.2S, and 3.2T is referred to as "regulation with phase shifting", and is itself known. In this context, the block transformer 3 may be referred to as a "regulation and phase shifting transformer". Such a device is sometimes also known as a "phase shift injection transformer" or a "phase shift insertion transformer".

A control unit 6 is associated with the switching unit 5 (FIG. 1). A signal from a measuring device 7 is input to control unit 6. Device 7 measures a physical parameter of the subsynchronous oscillations (particularly, for example, the difference between the instantaneous rotational frequency $\omega$ of the generator 2 and a set-point frequency $\omega_0$ (e.g., 50 Hz) of said generator, and transmits it as a measurement signal $\Delta\omega$, to the control unit 6. Alternatively, the signal from the measuring device 7 may represent a voltage, a current, a frequency, or a shaft torque, as the parameter of the subsynchronous oscillations.

It is unnecessary to describe the measuring device in detail, since it may be comprised in known fashion of known elements. Preferably, the instantaneous rotational frequency $\omega$ of generator 2 is measured by the measuring device 7 at a location as near as possible to the center of generator 2.

As a rule, the measurement signal $\Delta\omega$ will be sinusoidal. From this signal, the control unit 6 produces binary control signals B and $\overline{B}$, which are mutually complementary, and feeds these signals to the switching unit 5. For this purpose, the control unit 6 has on its input side, e.g. a square wave converter which generates a binary one signal when the polarity of the measuring signal $\Delta\omega$ at the input of said converter is negative, and a binary zero signal when the polarity of said measuring signal is positive. Advantageously, a lag device is inserted following the square wave converter, whereby said lag device produces a lag resulting in a phase shift of 320° (i.e., −40°) with respect to the period of the measuring signal $\Delta\omega$. The resulting delayed signal corresponds to the abovementioned control signal B. The complementary control signal $\overline{B}$ can be formed from control signal B by means of an inverter.

In the switching unit 5, the control signal B is fed to the control inputs of switches 5.1.1R, 5.1.4R, 5.1.1S, 5.1.4S, 5.1.1T, and 5.1.4T; and the complementary control signal $\overline{B}$ is fed to the control inputs of switches 5.1.2R, 5.1.3R, 5.1.2S, 5.1.3S, 5.1.2T, and 5.1.3T. In FIG. 2 the control inputs of the switches are labeled with the designations of the respective control signals to which they are connected.

If control signal B or $\bar{B}$ is in the "one" state, the corresponding controlled switches are closed; and if in the "zero" state, the corresponding controlled switches are open. In the case of the "one" state of control signal B, the control windings 3.3R, 3.3S, and 3.3T are connected to the power-network-side 3-phase windings 3.2T, 3.2R, and 3.2S in the "first switching mode". In the case of the "one" state of the complementary control signal $\bar{B}$, these connections are in the "second switching mode".

With control signal B in the "one" state, which pertains through most of the negative half-period of the measuring signal $\Delta\omega$ but not through the entirety of this half-period (due to the phase shift introduced by the lag device), a phase shift is produced in all the phases (R, S, and T), in the direction of the phase rotation direction of the 3-phase power network 4. In the same manner, with complementary control signal $\bar{B}$ in the "one" state, which pertains through most of the positive half-period of the measuring signal $\Delta\omega$, in all the phases (R, S, and T) a phase shift is produced in the direction opposite to the phase rotation direction of the 3-phase power network 4.

The resulting phase shift in the 3-phase power network 4, having the periodicity of the measuring signal $\Delta\omega$, provides extremely effective damping for the subsynchronous oscillations. It is sufficient that the voltages U3.3R, U3.3S, and U3.3T in the control windings 3.3R, 3.3S, and 3.3T be about 4% of the respective voltages U3.2T, U3.2R, and U3.2S in the power-network-side 3-phase windings 3.2T, 3.2R, and 3.2S (and of the voltages in the phases T, S, and R of the power network). In this regard, in FIG. 3 the voltages U3.3R, U3.3S, and U3.3T in the control windings 3.3R, 3.3S, and 3.3T are shown very exaggerated in relation to the voltages U3.2R, U3.2S, and U3.2T in the network-side 3-phase windings 3.2R, 3.2S, and 3.2T.

Figure 4:
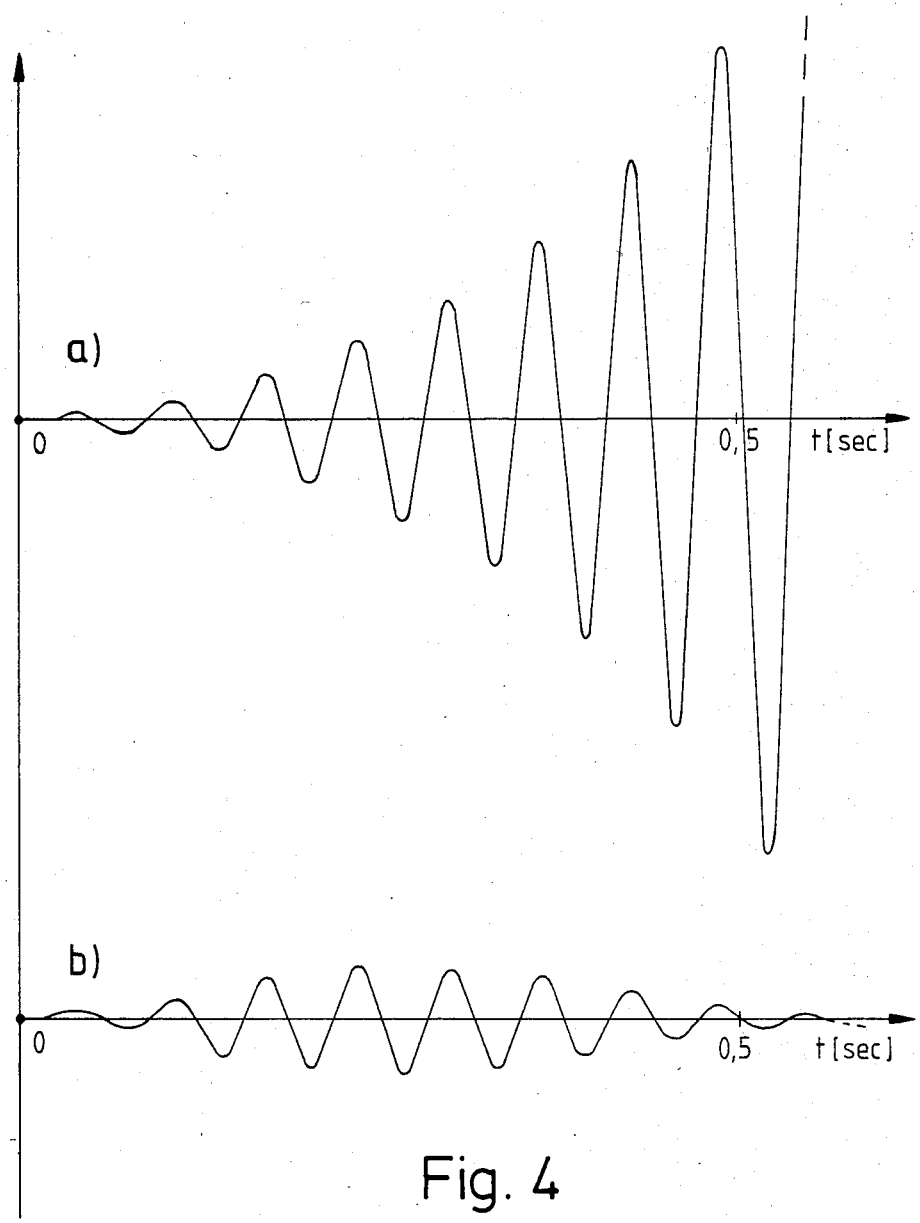
FIGS. 4a and 4b are two time plots, showing an undamped [FIG. 4a] subsynchronous oscillation, and a subsynchronous oscillation [FIG. 4b] damped according to the invention.

FIG. 4a represents a subsynchronous oscillation with an amplitude which increases dramatically with time, in the absence of the damping action of the inventive switching arrangement. FIG. 4b represents a subsynchronous oscillation which has been damped by the inventive switching arrangement. In comparison to the undamped oscillation of FIG. 4a, this oscillation advantageously fails to achieve any appreciable amplitude, and indeed after several oscillation periods it is practically completely damped.

Figure 5:
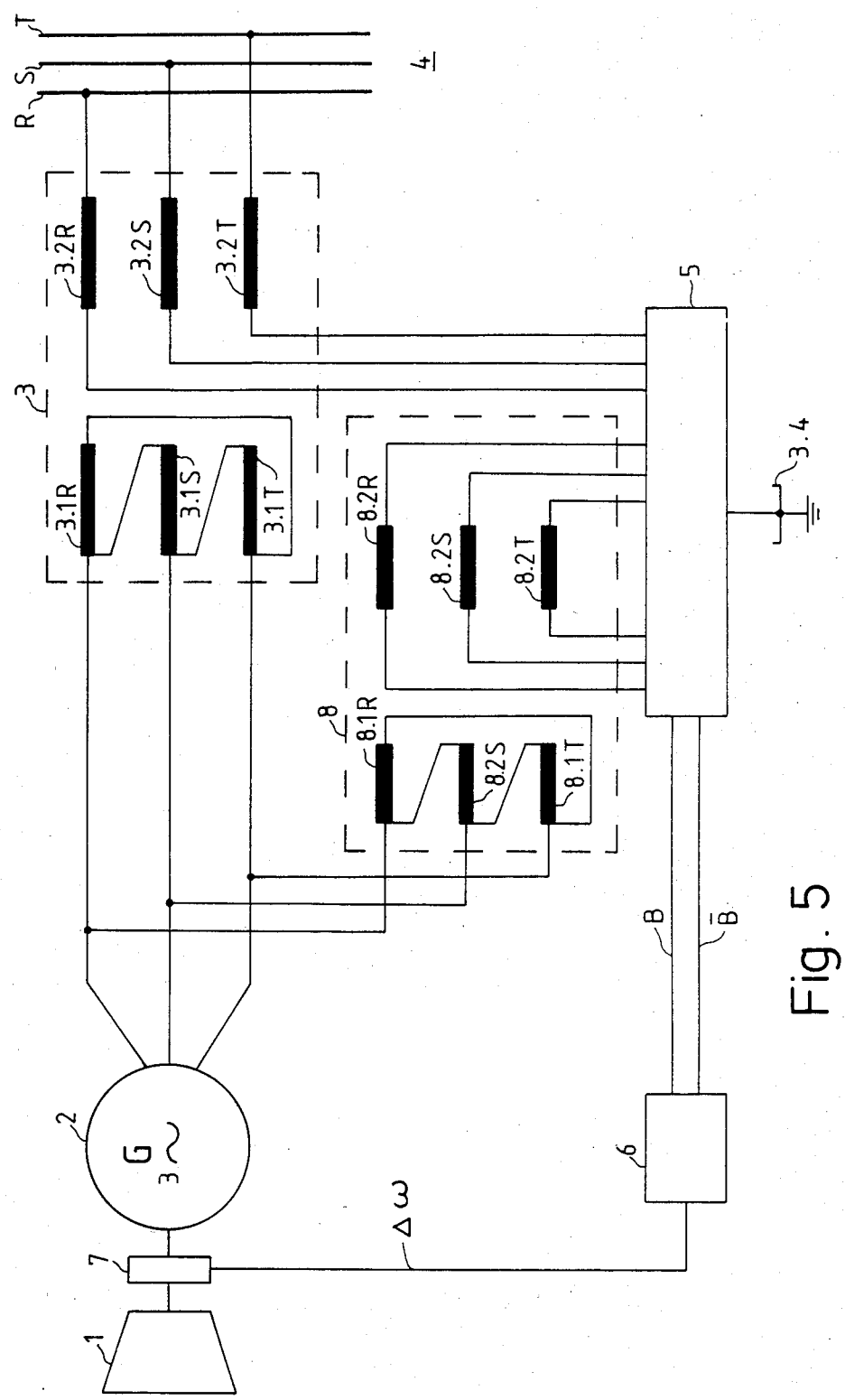
FIG. 5 is a second block circuit diagram of a 3-phase power system incorporating a second embodiment of the inventive switching arrangement.

FIG. 5 is a block circuit diagram of a 3-phase system incorporating a second embodiment of the inventive switching arrangement. Here, as distinct from the embodiment of FIG. 1, the control windings 3.3R, 3.3S, and 3.3T are not encompassed in the block transformer 3, but comprise the secondary 3-phase windings of a series transformer 8 which has its primary 3-phase windings 8.1R, 8.1S, and 8.1T connected to the phases R, S, and T of the 3-phase power network 4, in particular at locations on the generator side of the block transformer 3. In this second embodiment the block transformer is not a "regulation and phase shifting transformer". The star point of block transformer 3 is located in the switching unit 5, as was the case in the first embodiment. The circuit diagrams and mode of operation of the switching unit 5, control unit 6, and measuring device 7 are the same as with the first embodiment. In particular, the control windings 8.2R, 8.2S, and 8.2T are connected in the diagonal branches of the switching bridges 5.1R, 5.1S, and 5.1T, respectively. The reference numerals (8.2R etc.) assigned to the control windings in the second embodiment are shown in FIG. 2 in parentheses. As a result of the staggered connection of the control windings 8.2R, 8.2S, and 8.2T with the associated power-network-side 3-phase windings 3.2T, 3.2R and 3.2S of the block transformer 3 via the switching unit 5, the second embodiment also yields a phase difference of 120° or 60° (depending on the mode of connection) between the voltages in the control windings 8.2R, 8.2S, and 8.2T in the respective associated network-side 3-phase windings 3.2T, 3.2R, and 3.2S. Correspondingly there results a periodic phase rotation in the 3-phase power network 4, with the period of the measurement signal $\Delta\omega$, and this phase rotation tends to damp the subsynchronous oscillations.

The second embodiment of the invention may be advantageously and economically employed in existing 3-phase power network installations, while the first embodiment of the invention is preferable for new installations.

In both embodiments of the invention the control windings (3.3R-T or 8.2R-T) may be divided into a plurality of partial control-windings in series, and preferably their rating or number of turns may be graduated in a geometric series. Under this arrangement there would be a separate switching bridge in switching unit 5 for each such partial control-winding. The advantage of subdivision of the control windings is the ability to adjust the damping of the subsynchronous oscillations optimally for the prevailing excitation level at a given time, and to eliminate the oscillations with the minimum expenditure of energy required at the given time.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A switching arrangement for increasing stability and damping subsynchronous oscillations in a polyphase power system, comprising:
    a control winding that can be selectively connected in series with each phase winding of the power system, the control voltages induced in said windings being phase displaced with respect to the voltages of the windings in the power system;
    a switching unit for selectively connecting the control windings to the phase windings of the power system;
    a measuring device for generating a measurement signal representative of a physical parameter of subsynchronous oscillations; and
    control means responsive to said measurement signal for controlling said switching unit such that, when said control windings are connected to said phase windings, the net voltage across said phase windings is alternately phase shifted in two opposite directions of displacement in accordance with the polarity of said measurement signal.

2. The switching arrangement of claim 1, wherein said measurement signal represents the difference between the instantaneous rotational frequency of a generator for the power system and a predetermined frequency.

3. A switching arrangement according to claim 1, wherein the voltages in the control windings have a phase relation corresponding to the phase relation of the voltages in the phase windings of the polyphase power network, such that the phases of the windings, with which the control windings are connected, are respectively advanced.

4. A switching arrangement according to claim 1, wherein the control windings are respectively connectable on the star-point side of a block transformer which connects a generator to the polyphase power network so as to be in series with associated polyphase windings of the block transformer.

5. A switching arrangement according to claim 1, wherein said switching unit comprises, for each control winding, a switching bridge having switches which are disposed respectively in each of the branches of the bridge.

6. A switching arrangement according to claim 5, wherein the control windings are disposed respectively in diagonal branches of the switching bridges.

7. A switching arrangement according to claim 1, wherein the control windings are integrated into the block transformer after the fashion of a regulation and phase shifting transformer, and are connected with the power-network-side polyphase windings in staggered fashion.

8. A switching arrangement according to claim 1, wherein the control windings comprise the secondary polyphase windings of a series transformer the primary windings of which are connected to the polyphase power network.

* * * * *